US006251281B1

(12) United States Patent
Ohkawa

(10) Patent No.: US 6,251,281 B1
(45) Date of Patent: Jun. 26, 2001

(54) NEGATIVE ION FILTER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/451,693

(22) Filed: Nov. 30, 1999

Related U.S. Application Data

(63) Continuation-in-part of application No. 09/192,945, filed on Nov. 16, 1998, now Pat. No. 6,096,220.

(51) Int. Cl.[7] .............................. B03C 1/00; B01D 21/20

(52) U.S. Cl. .......................... 210/695; 210/748; 210/787; 210/222; 210/243; 210/512.1; 209/12.1; 209/227; 209/722; 96/2; 96/3; 95/28; 95/269; 55/447

(58) Field of Search .................................... 210/695, 748, 210/222, 223, 243, 787, 512.1; 209/12.1, 227, 722; 95/28, 269; 96/1, 2, 3; 55/447

(56) References Cited

U.S. PATENT DOCUMENTS

| | | |
|---|---|---|
| 3,722,677 | 3/1973 | Lehnert . |
| 4,861,477 | 8/1989 | Kimura . |
| 5,039,312 | 8/1991 | Hollis, Jr. et al. . |
| 5,350,454 | 9/1994 | Ohkawa . |
| 5,681,434 | 10/1997 | Eastlund . |
| 5,868,909 | 2/1999 | Eastlund . |
| 6,096,220 * | 8/2000 | Ohkawa ............................... 210/222 |

FOREIGN PATENT DOCUMENTS

| | | |
|---|---|---|
| PCT/GB97/00676 | 9/1997 | (WO) . |

OTHER PUBLICATIONS

Bittencourt, J.A., and Ludwig, G.O. Steady State Behavior of Rotating Plasmas in a Vacuum–Arc Centrifuge; *Plasma Physics and Controlled Fusion*, vol. 29, No. 5, pp. 601–620; Great Britain, 1987.

Bonnevier, Björn; Experimental Evidence of Element and Isotope Separation in a Rotating Plamsa; *Plasma Physics*, vol. 13; pp. 763–774; Northern Ireland, 1971.

Kim, C.; Jensen, R.V.; and Krishnan, M; Equilibria of a Rigidly Rotating, Fully Ionized Plasma Column; *J. Appl. Phys.*, vol. 61, No. 9; pages 4689–4690; May, 1987.

Dallaqua, R.S.; Del Bosco, E.; da Silva, R.P.; and Simpson, S.W; Langmuir Probe Measurements in a Vacuum Arc Plasma Centrifuge; *IEEE Transactions on Plama Science*, vol. 26, No. 3, pp. 1044–1051; Jun. 1998.

(List continued on next page.)

*Primary Examiner*—David A. Reifsnyder
(74) *Attorney, Agent, or Firm*—Nydegger & Associates

(57) ABSTRACT

A plasma filter for separating positive ions from negative ions in a multi-species plasma includes a cylindrical shaped chamber. Magnetic coils surrounding the chamber generate a magnetic field that is aligned substantially parallel to the chamber's longitudinal axis. An electrode generates an electric field that is substantially perpendicular to the magnetic field to create crossed magnetic and electric fields inside the chamber. The inward directed electric field has a negative potential on the longitudinal axis and a substantially zero potential at the wall of the chamber. An injector injects the multi-species plasma into said chamber to interact with said crossed magnetic and electric fields. With the chamber wall at a distance "a" from the longitudinal axis, a magnitude "$B_z$" for the magnetic field, a negative potential for the electric field of "$V_{ctr}$" along the axis and a substantially zero potential at the wall, a cut-off mass to charge ratio is calculated $M_c/e=a^2(B_z)^2/8V_{ctr}$, such that negative ions having a mass $M_1^{(-)}/e$ greater than $M_c/e$ will be ejected from the chamber for collection off the chamber wall, while all positive ions will be confined in the chamber for transit through the chamber for collection outside the chamber.

20 Claims, 1 Drawing Sheet

OTHER PUBLICATIONS

Dallaqua, Renato Sérgio; Simpson, S.W. and Del Bosco, Edson; Experiments with Background Gas in Vacuum Arc Centrifuge; *IEEE Transactions on Plasma Science*, vol. 24, No. 2; pp. 539–545; Apr. 1996.

Dallaqua, R.S.; Simpson, S.W.; and Del Bosco, E; Radial Magnetic Field in Vacuum Arc Centrifuges; *J. Phys. D.Apl.Phys.*, 30; pp. 2585–2590; UK, 1997.

Evans, P.J.; Paoloni, F. J.; Noorman, J. T. and Whichello, J. V.; Measurements of Mass Separation in a Vacuum–Arc Centrifuge; *J. Appl phys.* 6(1); pp. 115–118; Jul. 1, 1989.

Geva, M.; Krishnan, M; and Hirshfield, J. L. ; Element and Isotope Separation in a Vacuum–Arc Centrifuge; *J. Appl. Phys* 56(5); pp. 1398–1413; Sep. 1, 1984.

Krishnan, M.; Centrifugal Isotope Separation in Zirconium Plasmas; *Phys. Fluids* 26(9); pp. 2676–2682; Sep. 1983.

Krishnan, Mahadevan; and Prasad, Rahul R.; Parametric Analysis of Isotope Enrichment in a Vacuum–Arc Centrifuge; J. Appl. Phys. 57 (11); pp. 4973–4980; Jun. 1, 1985.

Prasad, Rahul R. and Krishnan, Mahadevan; Theoretical and Experimental Study of Rotation in a Vacuum–Arc Centrifuge; *J. Appl. Phys.*, vol. 61, No. 1; pp. 113–119; Jan. 1, 1987.

Prasad, Rahul R. and Mahadevan Krishnan; Article from *J. Appl. Phys.* 61(9); American Institute of Physics; pp. 4464–4470; May, 1987.

Qi, Niansheng and Krishnan, Mahadevan; Stable Isotope Production; p. 531.

Simpson, S.W.; Dallaqua, R.S.; and Del Bosco, E.; Acceleration Mechanism in Vacuum Arc Centrifuges; *J. Phys. D: Appl. Phys.* 29; pp. 1040–1046; UK, 1996.

Slepian, Joseph; Failure of the Ionic Centrifuge Prior to the Ionic Expander; p. 1283; Jun. 1955.

Anders, Andre; Interaction of Vacuum–Arc–Generated Macroparticles with a Liquid Surface; American Institute of Physics; 1998.

Yoshikawa, Masaji et al.; Plasma Confinement in a Toroidal Quadrupole; *The Physics of Fluids*; vol. 12, No. 9; Sep. 1969.

Ohkawa, Tihiro et al.; Plasma Confinement in dc Octopole; *Physical Review Letters*; vol. 24, No. 3; Jan. 19, 1970.

* cited by examiner

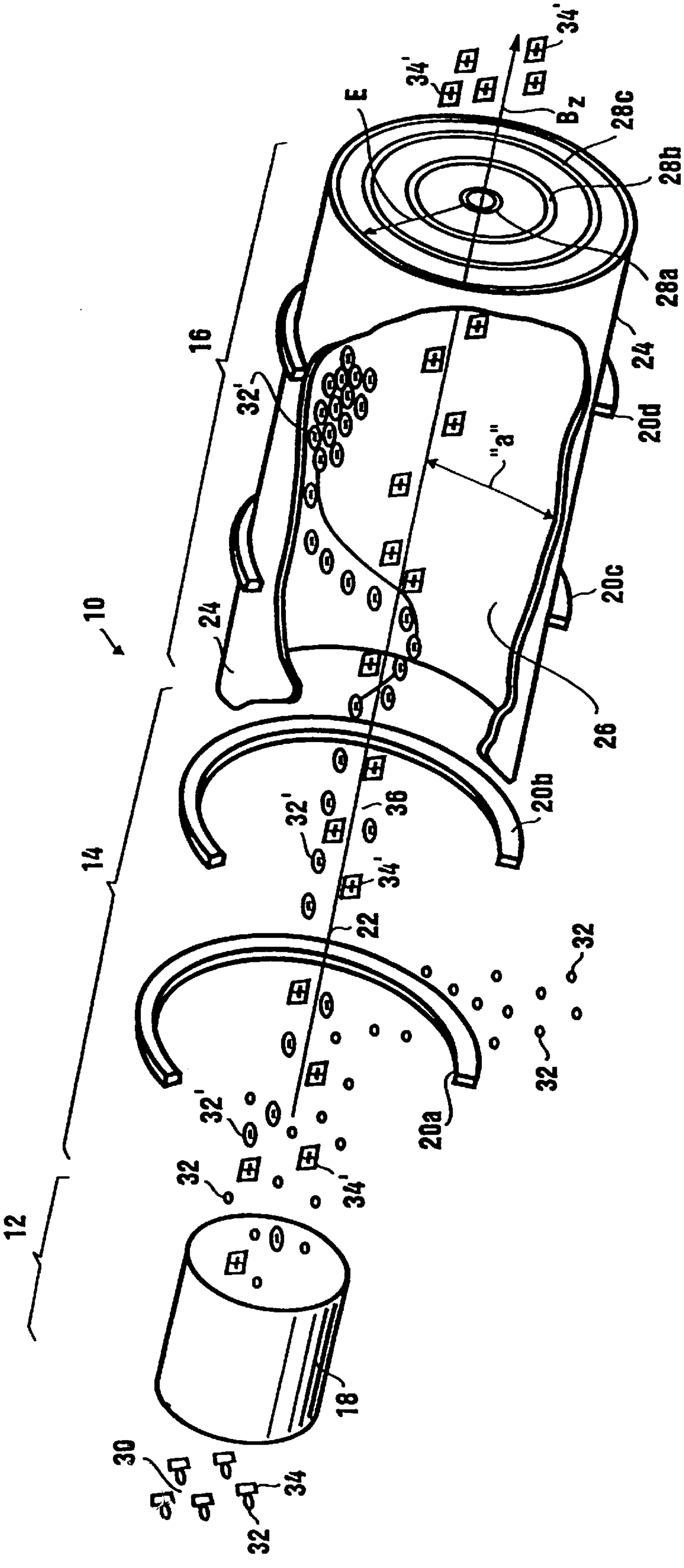
Figure

NEGATIVE ION FILTER

This application is a continuation-in-part of application Ser. No. 09/192,945, filed Nov. 16, 1998, now U.S. Pat. No. 6,096,220. The contents of application Ser. No. 09/192,945, now U.S. Pat. No. 6,096,220 are incorporated herein by reference.

FIELD OF THE INVENTION

The present invention pertains generally to devices and methods for separating the elements of a compound from each other. More specifically, the present invention pertains to devices and methods that create a multi-species plasma from the compound elements and then separate the ions of the multi-species plasma according to their mass and their charge. The present invention is particularly, but not exclusively, useful as a device and method for separating positive ions from negative ions when both positive and negative ions are in the same multi-species plasma.

BACKGROUND OF THE INVENTION

Whenever a multi-species plasma is generated using certain materials, it can happen that the resultant plasma will contain both positive and negative ions. This result is particularly possible when the material being ionized is a chemical compound which contains a halogen element, or an element such as oxygen or sulfur. As is well known, these elements all have a relatively high electron affinity and, consequently, the neutral atoms of these elements are quite easily joined with free electrons to create negative ions. On the other hand, these same elements also have a relatively high ionization potential and, therefore, electrons are not so easily detached from the neutral atom to create a positive ion.

For applications wherein a plasma is generated from chemical compounds which include a halogen as one of the constituent elements (also consider oxygen, sulfur), it is quite possible to generate a multi-species plasma that will include both positive and negative ions. Specifically, this result can occur when the plasma is generated using an ionization potential that is below the ionization potential of the halogen (or oxygen, sulfur). If this is the case, positive ions can still be created from the other elements in the compound, but not for the halogen (oxygen, sulfur) element. Instead, the halogen (oxygen, sulfur) element will remain neutral or be subsequently converted to a negative ion.

As indicated above, neutral atoms of a halogen (oxygen, sulfur) have a relatively high electron affinity. Consequently, these elements are much more susceptible to being converted to negative ions than are elements with relatively low electron affinity. For applications wherein the objective is to separate the halogen (oxygen, sulfur) element from the positive ions of another element, this susceptibility can be of considerable concern. Specifically, although neutral atoms (uncharged particles) can be relatively easily separated from positive ions (charged particles) in a plasma, the situation is much different when the neutral atoms themselves become negative ions (charged particles). When this happens, the negative ions are not so easily separated from the positive ions. Nevertheless, there are instances when both positive and negative ions may be present in the same multi-species plasma and it would be very desirable to separate them from each other, and thereby prevent them from recombining.

In U.S. Pat. No. 6,096,220, which was filed by Ohkawa on Nov. 16, 1998 for an invention entitled "Plasma Mass Filter," and which is assigned to the same assignee as the present invention, it has been shown that charged particles in a multi-species plasma can be separated from each other according to their respective masses. In particular, it has been shown that by using specifically configured crossed electric and magnetic fields (E×B) in a filter chamber, positive ions of relatively small mass to charge ratios can be confined inside the chamber during their transit of the chamber. On the other hand, positive ions of relatively large mass to charge ratios would not be so confined. Instead, these larger mass ions would be collected inside the chamber before completing their transit through the chamber.

Using the same general principles previously disclosed in Ohkawa's earlier invention for separating positive ions of different mass, the present invention has recognized that by appropriately modifying the crossed electric and magnetic fields (E×B) in a filter chamber, negative ions and positive ions can be separated from each other. More specifically, in this case, the positive ions in a multi-species plasma can be confined inside a plasma filter chamber during their transit of the filter chamber, while the negative ions in the plasma are expelled into the wall of the filter chamber.

In light of the above it is an object of the present invention to provide a plasma filter, and a method for its use, which is capable of separating positive ions from negative ions when both types of ions are present in the same multi-species plasma. Another object of the present invention is to provide a plasma filter, and a method for its use, that can effectively prevent positive ions from recombining with negative ions when both type ions are present in the same multi-species plasma. Yet another object of the present invention is to provide a plasma filter, and a method for its use, that expands the principles of plasma mass filter technology to multi-species plasma having both positive ions and negative ions in the plasma. Still another object of the present invention is to provide a plasma filter that is relatively easy to manufacture, is simple to use, and is comparatively cost effective.

SUMMARY OF THE PREFERRED EMBODIMENTS

A plasma filter for separating positive ions from negative ions in a rotating multi-species plasma includes a cylindrical shaped wall which surrounds a chamber and defines a longitudinal axis. A plurality of magnetic coils surround the outside of the chamber to generate an axially oriented magnetic field inside the chamber that is aligned substantially parallel to the longitudinal axis. A plurality of ring electrodes, or alternatively a spiral electrode, is also provided to generate a radial electric field in the filter chamber that is substantially perpendicular to the axial magnetic field. Importantly, the electric field has a negative potential along the longitudinal axis, and it has a substantially zero potential at the wall of the chamber. Thus, crossed magnetic and electric fields are created in the chamber.

A plasma injector is provided to inject a multi-species plasma into the chamber, to interact with the crossed magnetic and electric fields in the chamber. For the specific situation wherein the wall of the filter chamber is at a distance "a" from the longitudinal axis; wherein the magnetic field has a magnitude "$B_z$" in a direction along the longitudinal axis; wherein the negative potential of the electric field along the longitudinal axis has a value "$V_{ctr}$" and there is a substantially zero potential at the wall; it has been previously shown that a cut-off mass $M_c$ can be calculated such that: $M_c/e=a^2(B_z)^2/8V_{ctr}$, where e is the ion charge. The significance of $M_c$ is that negative ions having a mass $M_1^{(-)}/e$ that is greater than $M_c/e$ will be ejected into the wall of the chamber for subsequent collection. On the other hand, all positive ions will be confined inside the chamber during their transit through the chamber and can be collected after passing through the chamber. Thus, positive ions, $M_2^{(+)}$ are effectively separated from negative ions $M_1^{(-)}$ when both type ions are created in the same multi-species plasma.

BRIEF DESCRIPTION OF THE DRAWINGS

The novel features of this invention, as well as the invention itself, both as to its structure and its operation, will be best understood from the accompanying drawing, taken in conjunction with the accompanying description, in which similar reference characters refer to similar parts, and in which:

The FIGURE is a perspective-schematic view of a system incorporating the plasma filter of the present invention, with some portions of the system omitted and with portions of the plasma filter broken away for clarity.

DESCRIPTION OF THE PREFERRED EMBODIMENT

Referring to the FIGURE, a system which incorporates a plasma mass filter in accordance with the present invention is shown and is generally designated 10. As shown, the system 10 is generally divisible into three sections or stages. This division is done functionally and results in the system 10 having a plasma generation section 12, a neutrals discharge section 14, and a plasma filter 16.

In detail, the plasma generation section 12 includes a plasma injector 18 that may be of any type well known in the pertinent art, such as an Inductively Coupled Plasma (ICP) torch. Further, as is now well known, plasmas can be generated in any of several different ways using radio frequency (r.f.) power or microwave power. Although any suitable plasma generator may be used for the purposes of the present invention, it is an important aspect of the present invention that the electron temperature generated by the plasma injector 18 be both determinable and controllable.

As shown in the FIGURE, the system 10 includes a plurality of magnetic coils 20, of which the coils 20*a–d* are only exemplary. Specifically, these magnetic coils 20*a–d* are positioned in the system 10 to generate a magnetic field that is oriented generally parallel to the longitudinal axis 22. Further, the magnetic coils 20*a–d* generate the magnetic field such that it has a predetermined magnitude, $B_z$, on the axis 22. It is also an important consideration for the system 10 that the magnetic field lines extend from the injector 18 through both the neutrals discharge section 14 and the plasma filter 16.

The plasma filter 16 of the system 10 is shown in the FIGURE to include a substantially cylindrical shaped wall 24. This wall 24 effectively defines the longitudinal axis 22 of the system 10 and it surrounds a chamber 26. As shown, the wall 24 is at a distance "a" from the longitudinal axis 22. Also, it is seen in the FIGURE that the plasma filter 16 includes an electrode that will generate a radial electric field in the chamber 26. For this purpose, the plurality of electrode rings 28*a–c* are shown only by way of example. Any other suitable electrode, such as a spiral electrode, can be used to generate the electrical field, E, that is necessary for the purposes of the present invention. Specifically, the electric field E is negative and the potential on the axis, $V_{ctr}$, is negative and extends along the axis 22 and through the chamber 26. Additionally, there is a substantially zero potential at the wall 24. The result of this is that crossed electric and magnetic fields (E×B) are established in the chamber 26 of the plasma filter 16. As will be appreciated by the skilled artisan, the value for $V_{ctr}$ can be varied as necessary.

In the operation of the system 10, a compound material 30 is provided in either a gaseous, liquid or solid state. As intended for the present invention, the compound 30 will include at least one element 32 and another element 34 that are to be separated from each other during the operation of the system 10. For the purposes of the present invention, the element 32 will preferably be a halogen or an element such as oxygen or sulfur. Importantly, the element 32 should have an ionization potential that is well above the ionization potential of the element 34. Stated differently, the element 32 will not be as easily ionized as will the element 34 and, therefore, the element 34 can be separately ionized in the plasma injector 18 without ionizing the element 32. On the other hand, it will most likely be the case under these circumstances, that the element 32 will have a relatively high electron affinity. Certainly, the electron affinity of the element 32 will be higher than the electron affinity of element 34. An example of a compound 30 which has these particular characteristics is uranium hexafluoride ($UF_6$). In this example, the element 32 is the halogen fluorine (F) and the element 34 is depleted uranium ($U^{238}$).

For the operation of the system 10 it is necessary for the plasma injector 18 to establish an electron temperature that is sufficient to ionize the element 34, and thereby create a positive ion 34'. This same electron temperature, however, should be insufficient to ionize the element 32. Consequently, when the compound 30 is broken down into its constituent parts by the plasma injector 18, the element 32 is initially established as a neural atom. Thus, initially at least, a plasma is generated which contains neutral atoms of the element 32 and positive ions 34' of the element 34.

The separation of neutral atoms of element 32 from the positive ions 34' is accomplished in the neutrals discharge section 14 of the system 10. This separation is accomplished because the positively charged ions 34' will be restrained by the axially aligned magnetic field in the neutrals discharge section 14 from effectively leaving the longitudinal axis 22. The neutral atoms of element 32 on the other hand have no such constraint, and can be relatively easily diverted from the longitudinal axis 22. Specifically, this diversion can be accomplished in any manner known in the pertinent art, such as by pressure gradients. Once the neutral atoms of element 32 have been removed from the system 10, they are effectively separated from the positive ions 34' and can be easily collected. It happens, however, that the actual situation within the neutrals discharge section 14 is much more complicated. Because the neutral atoms of element 32 have a relatively high electron affinity, these neutral atoms are susceptible to attracting free electrons and becoming negative ions 32'. Many, do so. Consequently, within the neutrals discharge section 14 there are neutral atoms of element 32 (neutrals), negative ions 32' (charged particles) and positive ions 34' (charged particles).

As indicated in the FIGURE, the negative ions 32' (charged particles) will be restrained by the axially aligned magnetic field as they pass through the neutrals discharge section 14 just as are the positive ions 34' (charged particles). Consequently, the multi-species plasma 36 that enters the plasma filter 16 from the neutrals discharge section 14 will contain both positive ions 34' and negative ions 32'. For purposes of disclosure, in order to distinguish the lower mass negative ions 32' from the higher mass positive ions 34', the notation for negative ions 32' will sometimes appear as $M_1^{(-)}$, and the notation for the positive ions 34' will sometimes appear as $M_2^{(+)}$. With this in mind, it is a purpose of the present invention to establish a cut-off mass $M_c$ that is determined by $M_1^{(-)}$. The $M_2^{(+)}$ ions are confined because the electric field is inward.

For the specific situation wherein the wall 24 of the filter chamber 26 is at a distance "a" from the longitudinal axis 22, and with predetermined values for the magnetic field ($B_z$) and the potential ($V_{ctr}$) along the axis 22, a cut-off mass $M_c/e$ can be calculated such that: $M_c/e=a^2(B_z)^2/8V_{ctr}$. The significance of this $M_c/e$ is that negative ions 32' having a mass $M_1^{(-)}/e$ that is greater than $M_c/e$ will be ejected into the wall 24 of the chamber 26 for subsequent collection from the wall 24. On the other hand, positive ions 34' will be confined inside the chamber 26 during their transit through the chamber 26 and can be collected after passing through the chamber 26. Thus, positive ions 34' ($M_2^{(+)}$) are effectively separated from negative ions 32' ($M_1^{(-)}$) when both type ions are created in the same multi-species plasma 36.

While the particular Negative Ion Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A plasma filter for separating positive ions from negative ions in a rotating multi-species plasma wherein said negative ions result from elements having a higher ionization potential and a higher electron affinity than the elements of said positive ions, said filter comprising:

a cylindrical shaped wall surrounding a chamber, said chamber defining a longitudinal axis;

means for generating a magnetic field in said chamber, said magnetic field being aligned substantially parallel to said longitudinal axis;

means for generating an inward pointing electric field substantially perpendicular to said magnetic field to create crossed magnetic and electric fields, said inward pointing electric field having a negative potential on said longitudinal axis and a substantially zero potential on said wall; and means for injecting said rotating multi-species plasma into said chamber to interact with said crossed magnetic and electric fields for ejecting said negative ions into said wall and for confining said positive ions in said chamber during transit therethrough to separate said negative ions from said positive ions.

2. A filter as recited in claim 1 wherein "e" is the basic electron charge of said negative ions and said positive ions, wherein said wall is at a distance "a" from said longitudinal axis, wherein said magnetic field has a magnitude "$B_z$" in a direction along said longitudinal axis, wherein said negative potential on said longitudinal axis has a value "$V_{ctr}$", wherein said wall has a substantially zero potential, and wherein said negative ions have a mass to charge ratio greater than $M_c/e$, where $$M_c/e=a^2(B_z)^2/8V_{ctr}.$$

3. A filter as recited in claim 2 further comprising means for varying said magnitude ($B_z$) of said magnetic field.

4. A filter as recited in claim 2 further comprising means for varying said negative potential ($V_{ctr}$) of said electric field at said longitudinal axis.

5. A filter as recited in claim 1 wherein said means for generating said magnetic field is a magnetic coil mounted on said wall.

6. A filter as recited in claim 1 wherein said means for generating said electric filed is a series of conducting rings mounted on said longitudinal axis at one end of said chamber.

7. A filter as recited in claim 1 wherein said means for generating said electric field is a spiral electrode.

8. A method for separating negative ions from positive ions in a multi-species plasma wherein said negative ions result from elements having a higher ionization potential and a higher electron affinity than the elements of said positive ions, said method comprising the steps of:

surrounding a chamber with a cylindrical shaped wall, said chamber defining a longitudinal axis;

generating a magnetic field in said chamber, said magnetic field being aligned substantially parallel to said longitudinal axis and generating an inward pointing electric field substantially perpendicular to said magnetic field to create crossed magnetic and electric fields, said inward pointing electric field having a negative potential on said longitudinal axis and a substantially zero potential on said wall; and injecting said multi-species plasma into said chamber to interact with said crossed magnetic and electric fields for ejecting said negative ions into said wall and for confining said positive ions in said chamber during transit therethrough to separate said negative ions from said positive ions.

9. A method as recited in claim 8 wherein "e" is the basic electron charge of said negative ions and said positive ions, wherein said wall is at a distance "a" from said longitudinal axis, wherein said magnetic field has a magnitude "$B_z$" in a direction along said longitudinal axis, wherein said negative potential on said longitudinal axis has a value "$V_{ctr}$", wherein said wall has a substantially zero potential, and wherein said negative ions have a mass to charge ratio greater than $M_c/e$, where $$M_c/e=a^2(B_z)^2/8V_{ctr}.$$

10. A method as recited in claim 9 further comprising the step of varying said magnitude ($B_z$) of said magnetic field to alter $M_c/e$.

11. A method as recited in claim 9 further comprising the step of varying said negative potential ($V_{ctr}$) of said electric field at said longitudinal axis to alter $M_c/e$.

12. A method for separating negative ions from positive ions in a multi-species plasma wherein said negative ions result from elements having a higher ionization potential and a higher electron affinity than the elements of said positive ions, said method comprising the steps of:

generating a magnetic field, said magnetic field being aligned substantially along and parallel to an axis, and generating an inward pointing electric field substantially perpendicular to said magnetic field to create crossed magnetic and electric fields, said inward pointing electric field having a negative potential on said longitudinal axis and a substantially zero potential at a distance from said axis; and injecting said multi-species plasma into said crossed magnetic and electric fields to interact therewith for ejecting said negative ions away from said axis and for confining said positive ions within said distance from said axis during transit of said positive ions along said axis to separate said negative ions from said positive ions.

13. A method as recited in claim 12 further comprising the step of surrounding a chamber with a cylindrical shaped wall, said chamber defining said longitudinal axis.

14. A method as recited in claim 13 wherein "e" is the basic electron charge of said negative ions and said positive ions, wherein said wall is at a distance "a" from said longitudinal axis, wherein said magnetic field has a magnitude "$B_z$" in a direction along said longitudinal axis, wherein said negative potential on said longitudinal axis has a value "$V_{ctr}$", wherein said wall has a substantially zero potential, and wherein said negative ions have a mass to charge ratio greater than $M_c/e$, where $$M_c/e = a^2(B_z)^2/8V_{ctr}.$$

15. A method as recited in claim 14 further comprising the step of varying said magnitude ($B_z$) of said magnetic field to alter $M_c/e$.

16. A method as recited in claim 14 further comprising means the step of varying said negative potential ($V_{ctr}$) of said electric field at said longitudinal axis to alter $M_c/e$.

17. A method as recited in claim 14 wherein said magnetic field is generated using a magnetic coil mounted on said wall.

18. A method as recited in claim 14 wherein said electric field is generated using a series of conducting rings mounted on said longitudinal axis at one end of said chamber.

19. A method as recited in claim 14 wherein said electric field is generated using a spiral electrode.

20. A method as recited in claim 12 further comprising the step of creating the negative ions from elements of a group, wherein said group consists of halogens, oxygen and sulfur.

* * * * *